C. E. BANKS.
FRICTION CLUTCH.
APPLICATION FILED APR. 30, 1912.
1,043,290.
Patented Nov. 5, 1912
2 SHEETS—SHEET 1.
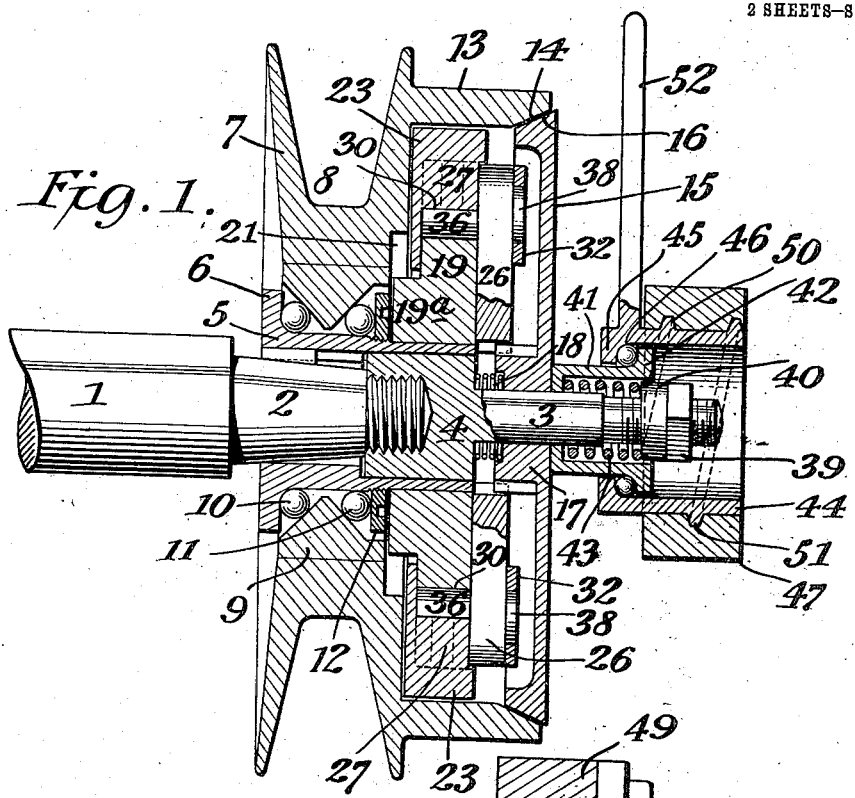
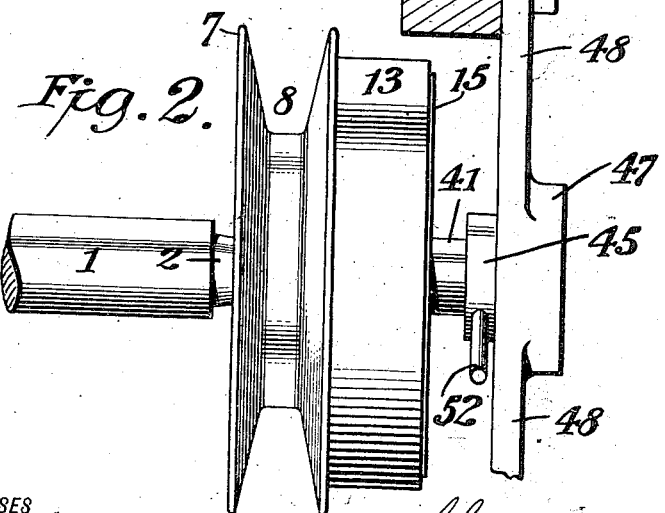
WITNESSES
INVENTOR
Charles E. Banks
BY
Edgar Tate & Co.
ATTORNEYS C. E. BANKS.
FRICTION CLUTCH.
APPLICATION FILED APR. 30, 1912.
1,043,290.
Patented Nov. 5, 1912.
2 SHEETS—SHEET 2.
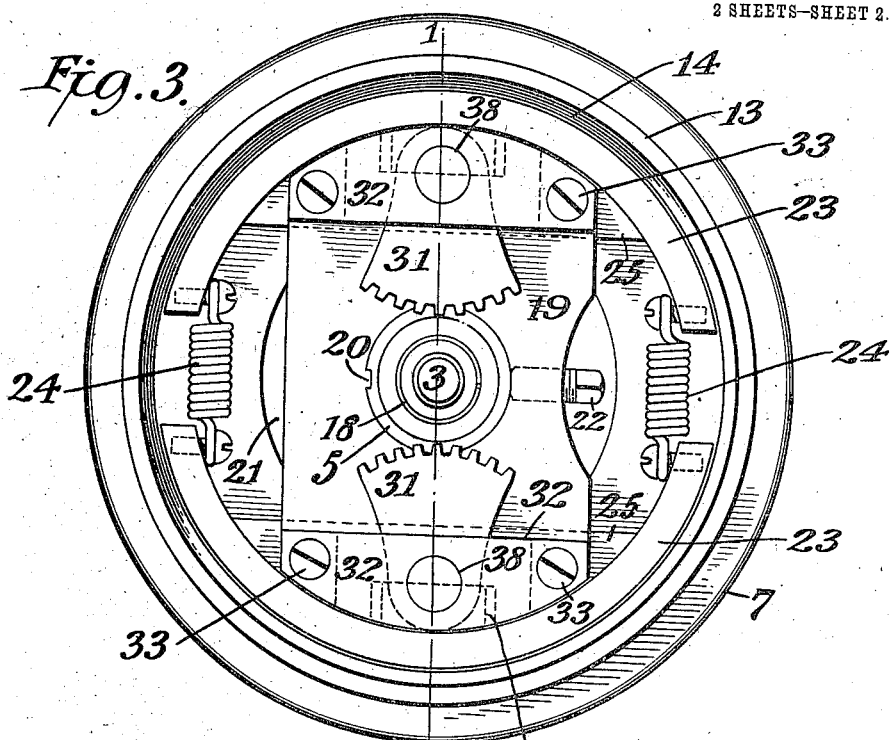
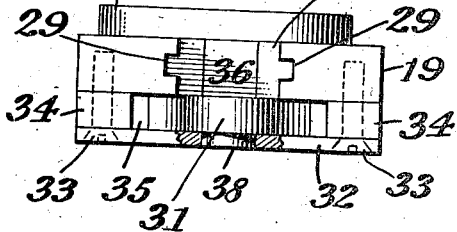
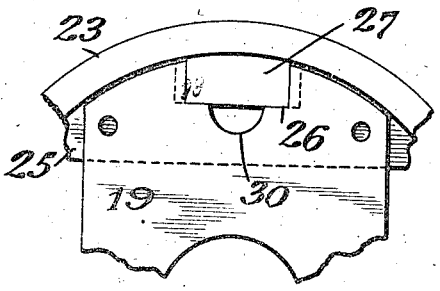
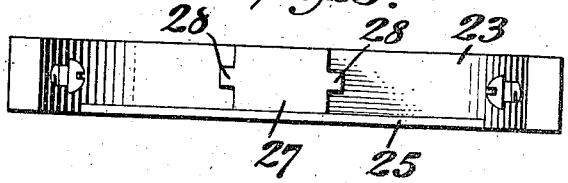
WITNESSES
INVENTOR
Charles E. Banks
BY Edgar Tate &Co.
ATTORNEYS.

UNITED STATES PATENT OFFICE.

CHARLES E. BANKS, OF ELMHURST, NEW YORK.

FRICTION-CLUTCH.

1,043,290.

Specification of Letters Patent. Patented Nov. 5, 1912.

Application filed April 30, 1912. Serial No. 694,139.

*To all whom it may concern:*

Be it known that I, CHARLES E. BANKS, a citizen of the United States, and residing at Elmhurst, Long Island, in the county of Queens and State of New York, have invented certain new and useful Improvements in Friction-Clutches, of which the following is a specification, such as will enable those skilled in the art to which it appertains to make and use the same.

This invention relates to friction clutches, and particularly to devices of this class designed for use as drivers for power propelled vehicles of the bicycle type; and the object thereof is to provide an improved clutch device of this class which is particularly designed as a coaster clutch for vehicles of this type, but which may be used for other purposes, and which possesses great power and which may be conveniently manipulated whenever desired to throw the mechanism thereof into or out of operation; a further object being to provide an improved clutch device of the class specified which may be manipulated to propel the vehicle in either direction, and with these and other objects in view the invention consists in a device of the class specified constructed and operated as hereinafter described and claimed.

The invention is fully disclosed in the following specification of which the accompanying drawing forms a part, in which the separate parts of my invention are designated by suitable reference characters in each of the views, and in which:—

Figure 1 is a sectional view of my improved clutch device on the line 1—1 of Fig. 3, and showing the same mounted on one end of a power shaft of a power driven vehicle:—Fig. 2 a plan view of the device, as shown in Fig. 1, on a reduced scale:—Fig. 3 a face view of the clutch device with the clutch plate and other parts removed:—
Fig. 4 an outer end view of a cross head which forms a part of the clutch mechanism, part of the construction being broken away:—Fig. 5 an inner view of one of the clutch-shoes, two of which I employ:—Fig. 6 a view similar to Fig. 3 but showing only part thereof and showing one end of the cross head and part of one clutch-shoe, and:—Fig. 7 a fragmentary view of a quadrant gear two of which I employ.

In the drawing forming part of this specification I have shown at 1 the power shaft of a power driven vehicle of the bicycle type, and said power shaft is provided with a spindle 2 the body portion of which is tapered and the end portion of which is threaded, and I also provide a supplemental spindle 3 having a cylindrical head 4 which is screwed onto the threaded portion of the spindle 2.

Keyed to the spindle 2 and inclosing the head 4 of the spindle 3 is a hub sleeve 5 provided at its inner end with a flange 6, and mounted on the inner end portion of the hub sleeve 5 is a power wheel 7 having a deep annular groove 8 and the hub of which is preferably composed of two parts, the inner part 9 being composed of hard steel or similar material and being V-shaped in cross section the opposite sides thereof being beveled, as shown in Fig. 1, and between the part 9 of the hub of the wheel 7 and the outer end portion of the hub sleeve 5 are two ball races in which are placed ball bearings 10 and 11, the inner set of said ball bearings being held in place by a collar 12 screwed onto the hub sleeve 5.

The wheel 7 is provided on its outer side with an annular rim 13 which is provided with an inner beveled surface 14, and mounted on the spindle 3 is a clutch disk 15 the rim of which is beveled, as shown at 16, to correspond with the beveled surface 14 of the rim 13, which forms one member of a clutch.

The disk 15 is provided with a hub 17 between which and the adjacent end of the head 4 of the spindle 3 is placed a spiral spring 18, and mounted on the outer end portion of the hub sleeve 5 is a cross head 19 which is keyed to the hub sleeve 5, as shown at 20 in Fig. 3.

The central part of the cross head 19 is provided with a hub portion 19ᵃ which enters a corresponding recess 21 in the adjacent face of the hub of the wheel 7, and said cross head 19 is secured to the hub sleeve 5 by a set screw 22 which is designed to prevent the movement of said cross head longitudinally of said hub sleeve.

Between the outer end portions of the cross head 19 are placed arc-shaped clutch shoes 23 which are approximately semi-circular in form and the adjacent ends of which are connected by spiral springs 24, and these clutch shoes operate in connection with the inner surface of the rim 13 of the wheel 7 and are normally held out of engagement with said rim by said springs.

The clutch shoes 23 are provided on their inner sides with inwardly directed flanges 25 which are overlapped by the ends of the cross head 19, and the ends of said cross head are provided in their outer faces with recesses 26 adapted to receive rectangular bearing blocks 27 with which the inner faces of the clutch shoes 23 are provided centrally thereof and which are formed integrally with said clutch-shoes, and the blocks 27 are provided with side tongues 28 movable in corresponding grooves 29 in the ends of the cross head 19, and the opposite ends of the cross head 19 are provided with supplemental semi-circular recesses 30 which communicate with the recesses 26, as clearly shown in Fig. 6, and mounted on the outer sides of the end portions of the cross head 19 are quadrant gears 31 which are held in place by plates 32 bolted or screwed to said cross head as shown at 33, and between which and the ends of the cross head are placed spacing blocks 34 which form chambers 35 in which the gears 31 are adapted to rotate.

The gears 31 are provided with trunnions 36 which are semi-circular in cross section to fit in the recesses 30 and are adapted to bear on the blocks 27 of the clutch-shoes 23 and said trunnions 36 are provided at their outer ends with circular heads 38 rotatable in the plates 32. The gears 26, the trunnions 36 and the heads 38 may all be formed integrally, or said trunnions may be formed separately and the gears 26 may be keyed to or otherwise secured thereto, and said gears normally engage the hub gear 17 of the clutch disk 15, but said hub gear is movable longitudinally through the gears 31 or the teeth thereof.

The spindle 3 projects beyond the clutch disk 15, and the outer end portion thereof is threaded and provided with a nut 39 inwardly of which is placed a washer 40, and mounted on the spindle 3 is a housing 41 the outer end portion of which is open and provided with an outwardly directed flange 42, and placed in the housing 41 and bearing on the washer 40 and on the inner end of said housing is a spiral spring 43 which is much stronger than the spring 18.

Mounted on and movable longitudinally of the housing 41 is a casing 44 the inner end of which is provided with an inwardly directed annular flange 45 between which and the flange 42 of the housing 41 is a ball race 46 in which are placed ball bearings.

Inclosing the casing 44 is a hub member or device having side arms 48 by which it may be secured to the frame 49 of the vehicle or to any suitable support, and the hub device 47 is provided in this inner face with a spiral thread groove 50, and the casing 44 is provided with a corresponding spiral thread 51, and said casing is also provided inwardly of the hub device 44 with a handle lever or bar 52 by which the casing 44 may be turned in said hub device 47 by hand. As thus constructed it will be seen, that the hub sleeve 5, the cross head 19, the clutch-shoes 23, the gears 26 and the clutch disk 15 are all connected, the connection between the clutch disk and the gears 26 being through the teeth of said gears and the teeth of the hub gear 11 of said disk, and when the parts are in the position shown in Fig. 1, in which the clutch disk 15 is out of engagement with the rim 13 of the wheel 7, the said wheel 7 is free to turn independent of said parts.

It will be understood that in practice the wheel 7 is geared in connection with the rear axle of the vehicle in the usual manner by means of a belt, and in the operation of starting the vehicle the handle lever 52 is moved so as to force the casing 38 inwardly. This operation enables the spring 43 to force the clutch disk 15 inwardly and into engagement with the rim 13 of the wheel 7, and this frictional engagement between said clutch disk and said rim is sufficient to cause the clutch disk to rotate with said wheel, and this operation of the clutch disk is transmitted to the gears 26 through the hub 17 of said clutch disk, and said gears are rotated and the trunnions 36 of said gears operate on the clutch shoes 23 through the blocks 27, and said clutch-shoes are forced outwardly into connection with the rim 13 of the wheel 7 with great force and said clutch-shoes firmly engage said rim and the entire power is transmitted to the wheel 7, as will be readily understood.

In order to throw the clutch mechanism out of operation the handle lever 52 is moved in the opposite direction, and the parts again assume the position shown in Fig. 1, and the wheel 7 is free to rotate independent of the spindle 2 or the power shaft 1.

From the foregoing description, it will be seen, that the movement of the handle lever 52 first throws the clutch disk 15 into frictional engagement with the rim 13 of the wheel 7, and the rotation of said disk with said wheel operates through the hub of said disk, the gears 26, and the trunnions 36 of said gears to throw the clutch-shoes 23 into connection with the rim 13 of said wheel, and by reason of the form of the trunnions 36, their method of engagement with the clutch-shoes 23 and the method of operating the gears 26 the force of said clutch-shoes is great, and this force may be brought into operation by a comparatively slight movement and slight power applied to the handle lever 52.

My invention is not limited to the use of my improved clutch in connection with a power driven vehicle, as it will be apparent that the same may be applied for various other purposes in connection with power mechanisms of various kinds and classes; and it will also be apparent that changes in and modifications of the construction of my improved clutch device, as herein shown and described, may be made, within the scope of the appended claims, without departing from the spirit of my invention or sacrificing its advantages.

It will also be understood that my invention is not limited to the power shaft and the spindle 2 thereof and in connection with which said invention is employed, but consists of the spindle member 3 having a head 4 adapted to be connected with the spindle 2 and on which the hub member 5 is mounted together with other operative parts of the construction, as herein shown and described, and said clutch mechanism may be applied to power shafts of any kind or class having suitable spindles adapted to be engaged by the head 4 of the spindle 3, onto which said spindle 3 could be secured.

Having fully described my invention what I claim as new and desire to secure by Letters Patent is:—

1. A clutch mechanism comprising a central hub member, a spindle provided with a head which is secured in said hub member, a power wheel rotatable on the inner end of the hub member and provided on its outer side with a clutch rim, a cross head secured to the hub member on the outer side of the power wheel, clutch shoes mounted between the opposite ends of the cross head and said clutch rim and normally held out of engagement with said rim, a clutch disk mounted on said spindle and movable longitudinally thereof and adapted to engage said clutch rim, and provided with a central hub gear, quadrant gears rotatably mounted on the outer face of the cross head and meshing with said hub gear and provided with trunnions which are rotatable between the ends of the cross head and the clutch shoes, said trunnions being of greater transverse dimensions in one direction than the other and means for throwing said clutch disk into engagement with said rim.

2. In a clutch mechanism of the class described, a central hub member, a spindle having a head secured in the outer end of the hub member, a rotatable power wheel mounted on the inner end of the hub member and provided on its outer side with an annular clutch rim, a cross head secured to the outer end of the hub member, clutch-shoes mounted between the cross head and the clutch rim and movable toward and from said rim, a clutch disk mounted on said spindle and movable longitudinally thereof and adapted to engage said clutch rim, and provided with a central hub gear, quadrant gears mounted on the outer side of the cross head and engaging said hub gear and provided with trunnions which operate between said clutch-shoes and said cross head to force said clutch-shoes outwardly and into engagement with said rim, and hand operating devices for forcing said clutch disk inwardly and into engagement with said rim.

3. A clutch mechanism of the class described, comprising a central hub member, a spindle having a head secured in the outer end of the hub member and adapted to be connected with the spindle of a power shaft, a rotatable power wheel mounted on the inner end of the hub member and provided on its outer side with a clutch rim, a cross head mounted on the outer end of the hub member, arc-shaped clutch-shoes mounted between the ends of the cross head and clutch rim, and connected by spiral springs which hold said clutch-shoes out of engagement with said rim, a clutch disk mounted on said spindle and movable toward and from said cross head and adapted to engage said rim, and provided with a central hub gear and quadrant gears mounted on the outer face of said cross head and engaging said hub gear, and said gears being provided with trunnions operating between said clutch-shoes and said cross head and by which said clutch-shoes are forced outwardly into engagement with said clutch rim, when said gears are rotated.

4. In a clutch mechanism of the class described, a spindle, a clutch disk movable longitudinally of said spindle, a spring for forcing said clutch disk outwardly, another spring of greater power than the first named spring, for forcing said clutch disk inwardly, means for holding the last named spring out of operation, and hand operating devices for releasing said last named spring and allowing it to operate.

5. In a clutch mechanism of the class described, the combination with a spindle of a hub member keyed thereto, a supplemental spindle secured in the outer end of the hub member, a power wheel rotatable on the inner end of the hub member and provided on its outer side with a clutch rim, a cross head secured to the outer end of the hub member, clutch-shoes mounted between the opposite ends of the cross head and the clutch rim, and normally held out of engagement with said rim, a clutch disk movable longitudinally on the supplemental spindle and adapted to engage said rim and provided with a gear hub, quadrant gears mounted on the cross head and meshing with said hub and provided with trunnions adapted to force said clutch-shoes outwardly into engagement with said rim, and means for moving said clutch disk longitudinally of the supplemental spindle.

In testimony that I claim the foregoing as my invention I have signed my name in presence of the subscribing witnesses this 29th day of April, 1912.

CHARLES E. BANKS.

Witnesses:
C. MULREANY,
S. ANDREWS.